S. Ayres.
Animal Trap.
N° 85,780.   Patented Jan. 12, 1869.

Witnesses:   Inventor:

SAMUEL AYRES, OF WORCESTER, MASSACHUSETTS.

Letters Patent No. 85,780, dated January 12, 1869.

IMPROVED ANIMAL-TRAP.

The Schedule referred to in these Letters Patent and making part of the same.

*To all whom it may concern:*

Be it known that I, SAMUEL AYRES, of the city and county of Worcester, State of Massachusetts, have invented a new and useful Improvement in Spring-Traps; and I do hereby declare the following to be a full, clear, and exact description of the same, reference being had to the accompanying drawings, representing said invention. In said drawings—

My invention relates to the locking or fastening the doors when closed, so that the enclosed animal cannot push its way out.

It consists in forming a locking-bar adapted to slide or swing on the doors in such a way that it shall fall into place on the springing or shutting of the trap, and be easily removed to take out the animal or reset it, but shall effectually lock it when in place.

Figure 1:
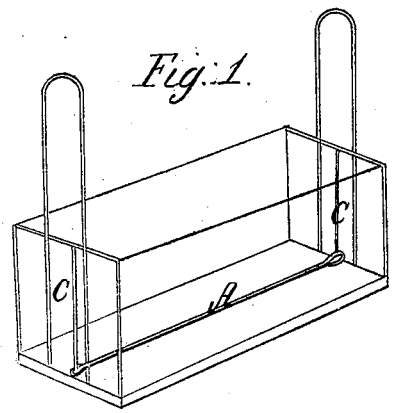
Figure 1 is a perspective view of a trap, with my improvement.
Figure 2:
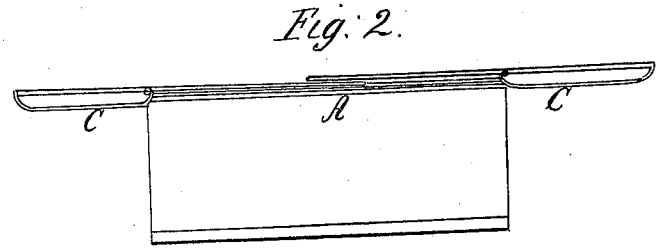
Figure 2 is a side view of the same, with the ends open as when set.

My invention may be applied to most any of the common forms and construction of traps, the rod A (see drawings) being arranged to slide on the wires C C on each door, so that, when near the top, as in fig. 2, the doors may be opened and the trap set, and, when the doors close, it falls into position shown in fig. 1, locking both.

What I claim as new, and desire to secure by Letters Patent, is—

The application of the locking-rod A, in combination with the wires C C on the doors, or their equivalents, when constructed and operating substantially as set forth and described.

SAMUEL AYRES.

Witnesses:
A. E. ACKLEY,
JAMES G. ARNOLD.